United States Patent [19]

Slicer et al.

[11] Patent Number: 4,705,334

[45] Date of Patent: Nov. 10, 1987

[54] ELECTRICAL DISTRIBUTION SYSTEM HAVING AN IMPROVED SPLICE JOINT BETWEEN BUSWAY SECTIONS

[75] Inventors: Allan E. Slicer; Robert I. Whitney, both of Brookville, Ind.

[73] Assignee: Square D Company, Palatine, Ill.

[21] Appl. No.: 878,389

[22] Filed: Jun. 19, 1986

Related U.S. Application Data

[63] Continuation of Ser. No. 650,379, Sep. 13, 1984.

[51] Int. Cl.$^4$ .............................................. H02G 5/08
[52] U.S. Cl. ................................... 439/210; 174/68 B
[58] Field of Search .................... 339/22 B, 22 R, 20, 339/21 R, 23, 24; 174/99 B, 68 B

[56] References Cited

U.S. PATENT DOCUMENTS

| | | | |
|---|---|---|---|
| Re. 26,310 | 11/1967 | Moodie et al. | 174/68 B |
| 3,104,276 | 9/1963 | Cataldo | 174/68 B |
| 3,187,086 | 6/1965 | Moodie et al. | 174/68 B |
| 3,189,680 | 6/1965 | Stanback | 174/99 B |
| 3,384,855 | 5/1968 | Jorgensen et al. | 339/22 B |
| 3,458,647 | 7/1969 | Fouse | 174/68 B |
| 3,566,331 | 2/1971 | Stanback et al. | 339/22 R |
| 3,909,098 | 9/1975 | Reed et al. | 339/22 B |
| 4,009,920 | 3/1977 | Hicks, Jr. et al. | 339/22 B |
| 4,053,194 | 10/1977 | Gilman | 339/21 R |

Primary Examiner—Eugene F. Desmond
Assistant Examiner—Thomas M. Kline
Attorney, Agent, or Firm—Larry I. Golden; Richard T. Guttman

[57] ABSTRACT

A removable splice joint between two sections of busway constructed to prevent undesired relative movement of the component parts of the joint while also providing interchangeability between component parts and thereby reducing the number of different parts required for assembly of the joint. The joint includes a top cover plate and a bottom cover plate, each with an inclined periphery, a pair of identical outer phase barriers and a plurality of identical inner phase barriers. Each outer barrier includes a pair of ears which are respectively received in associated slots formed in the cover plates. Molded ribs formed on the barriers in cooperation with a square insulating tube which extends between the two outer phase barriers and through each of the inner phase barriers restrict relative movement between component parts of the joint assembly which is captivated by a bolt extending through each of the cover plates as well as each of the barriers. A pull strap connected to the top and bottom cover plates permits the joint to be removed from the side of a busway section permitting selective isolation of a segment of an electrical distribution system.

4 Claims, 11 Drawing Figures

ELECTRICAL DISTRIBUTION SYSTEM HAVING AN IMPROVED SPLICE JOINT BETWEEN BUSWAY SECTIONS

This application is a continuation of application Ser. No. 650,379, filed on Sept. 13, 1984.

BACKGROUND OF THE INVENTION

1. Field of the Invention

This invention relates to an electrical distribution system, and more particularly to an improved splice joint between sections for use with both feeder busway and plug-in busway.

2. Description of the Prior Art

The present invention represents an improvement over the electrical distribution systems disclosed in U.S. Pat. No. 3,566,331, issued Feb. 23, 1971 as well as U.S. Pat. No. 3,384,855, issued May 21, 1968, to which reference may be had for description of common features and applications. Other features and applications of the distribution system may be further understood by reference to U.S. Pat. No. 3,187,086, issued June 1, 1965, reissued as U.S. Pat. No. 026,310, on Nov. 28, 1967 as well as U.S. Pat. No. 3,909,098, issued Sept. 30, 1975. Each of the afore-mentioned patents is assigned to the same assignee as the instant invention and is hereby incorporated by reference.

SUMMARY OF THE INVENTION

It has been found desirable to provide a splice joint connection between sections of busway which can be readily removed to isolate sections of a distribution system.

The present distribution system is provided with a pullout isolation joint which permits isolation of selected busway sections by removal of appropriate isolation joints. The joints are constructed to facilitate assembly and prevent undesired relative movement of the component parts while the joint is removed.

It is an object of the present invention to provide an improved electrical distribution system of economic construction.

It is a further object of this invention to provide versatile components which may be used in several applications.

Further objects and features of the invention will be readily apparent to those skilled in the art from the following specification including the appended claims and the accompanying drawings of the invention in which:

DESCRIPTION OF THE PREFERRED EMBODIMENT

Figure 1:
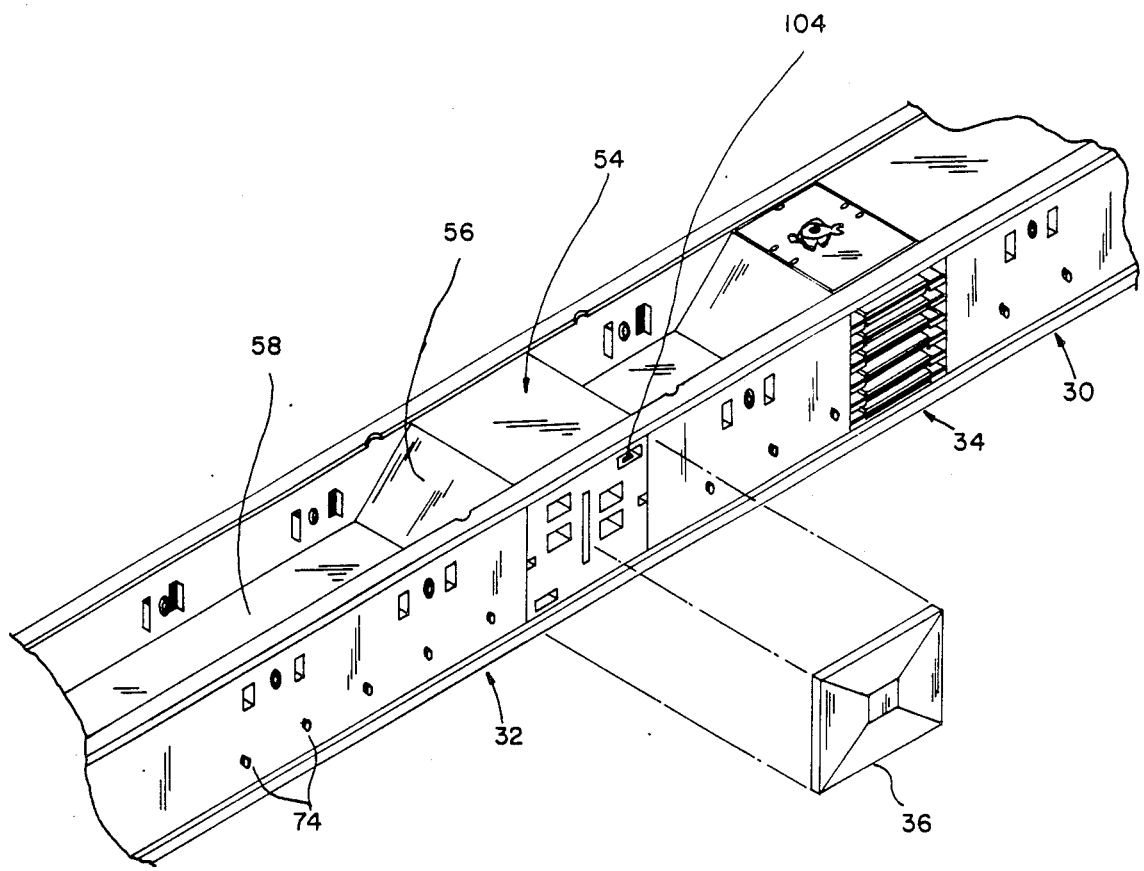
FIG. 1 is a perspective view showing connected feeder and plug-in sections of busway in accordance with the present invention.

The electrical distribution system of the present invention is described with respect to both feeder sections of bus bars generally identified as 30 in FIG. 1 of the Drawings and plug-in sections of bus bars identified generally by reference character 32. The present design is intended for busway systems carrying from 800 A through 5000 A, although it is not necessarily restricted to such applications. The current carrying capacity of the busway is dependent upon the size and material of the individual bus bars as well as the number of runs of bus bars within a busway section. The U.S. Pat. No. 3,384,855 discloses both single and double runs of bus bars. The plug-in sections 32 are provided with plug-in openings 34 at various locations along its length as discussed, for example, in the previously referred to U.S. Pat. No. 3,566,331. The plug-in openings facilitate the tap-off of current from those locations and are covered by a swingable door 36 when the opening is not being used. The bus bars 40 are carried between a pair of side rails 38 which will later be further described.

The main phase bus bars 40 of the instant invention are appropriately insulated as shown, for example in U.S. application, Ser. No. 650,376, by Allan Slicer filed concurrently herewith, the disclosure of which is hereby incorporated by reference. The bars are carried in stacked relationship except where physical separation of the bars is required to facilitate a splice connection between sections of busway or at the tap off locations of the plug-in busway. At those locations where connections may be made, the bus bars are offset to provide sufficient clearance between bars for connections. The main phase bus bars are enveloped by a ground bus 42 which includes an upper section 44 and a lower section 46. The upper section includes a top portion 44a with opposite side flanges 44b extending toward the lower section. The lower section 46 includes a bottom portion 46a with similarly extending side flanges 46b, although the lower side flanges 46b are substantially shorter than the upper side flanges 44b. The lower section 46 is positioned between the flanges 44b of the upper section, such that the two pairs of flanges are substantially aligned at the bottom edge thereof, with the main phase bus bars 40 sandwiched between the top portion of the upper section 44 and the bottom portion of the lower section 46 while also being located between the side flanges 44b of the upper section.

Figure 2:
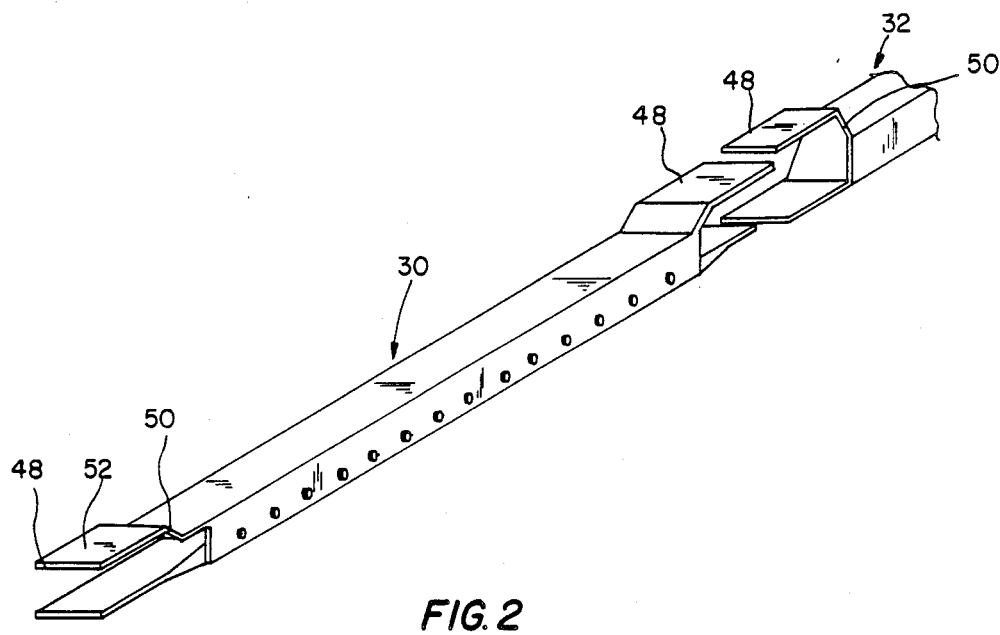
FIG. 2 is a perspective view showing the ground bus in accordance with the instant invention.
Figure 3:
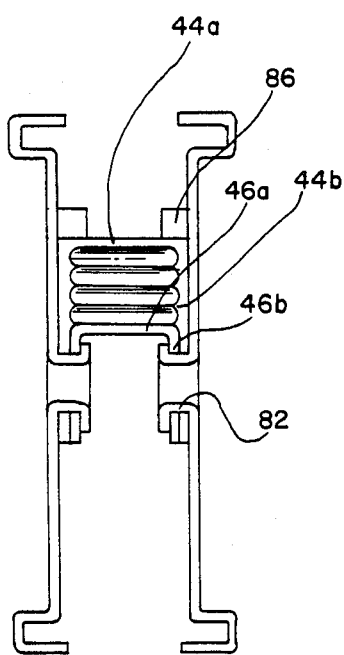
FIG. 3 is a cross sectional view showing the housing enclosing the main phase bus bars in accordance with the present invention.
Figure 4:
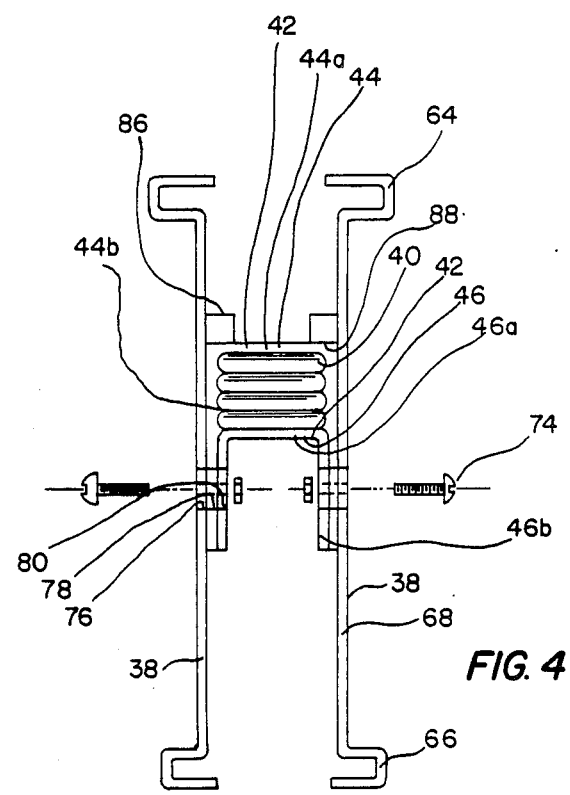
FIG. 4 is a cross sectional view as shown in FIG. 3 incorporating an alternate method of fastening.
Figure 5:
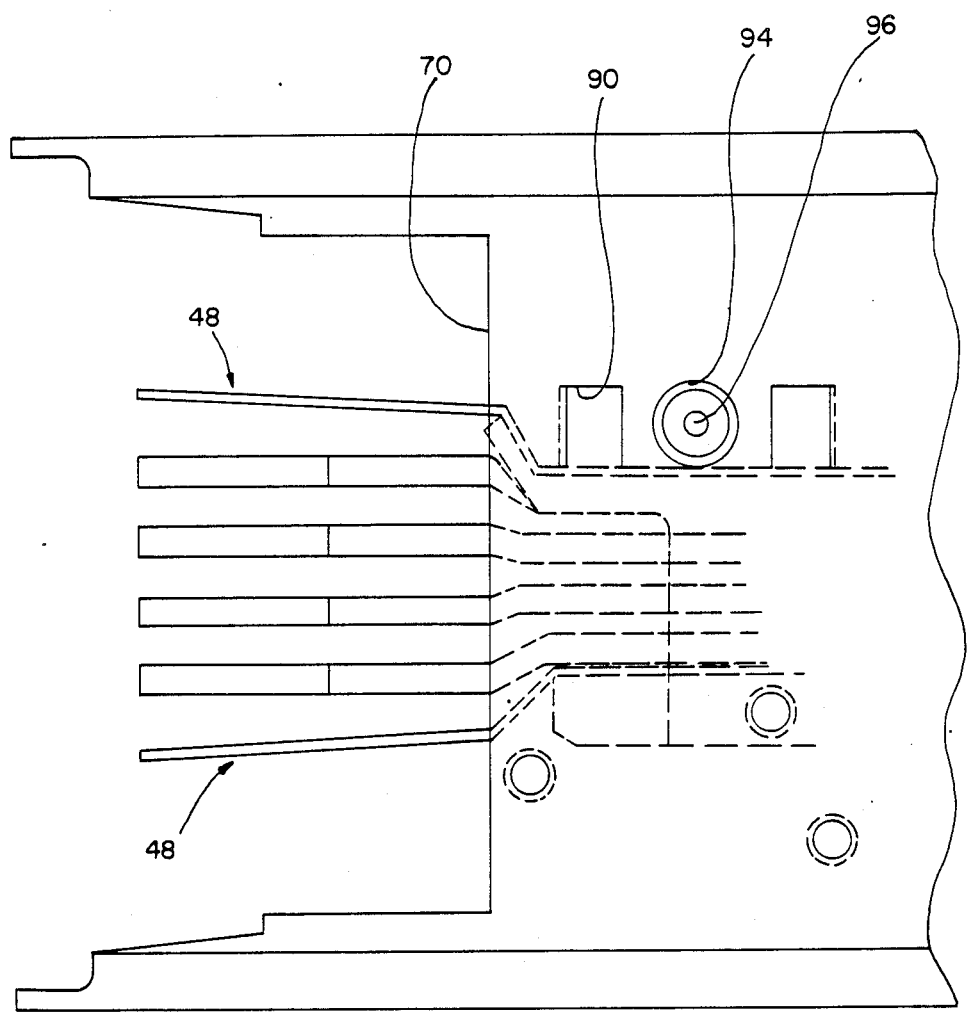
FIG. 5 is a partial side view showing an end of a section of busway in accordance with the present invention.
Figure 6:
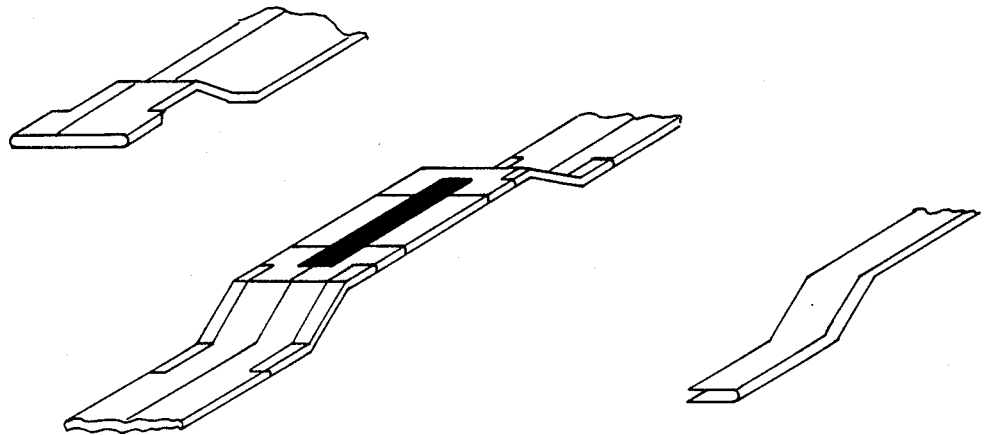
FIG. 6 is a perspective view showing an insulated bus bar in accordance with the present invention.
Figure 7:
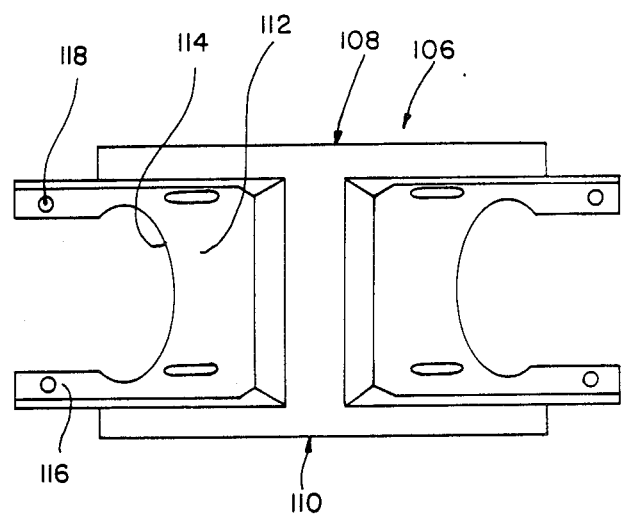
FIG. 7 is a side view of a tie channel used to tie adjoining sections of the busway as shown in FIG. 1 together.
Figure 8:
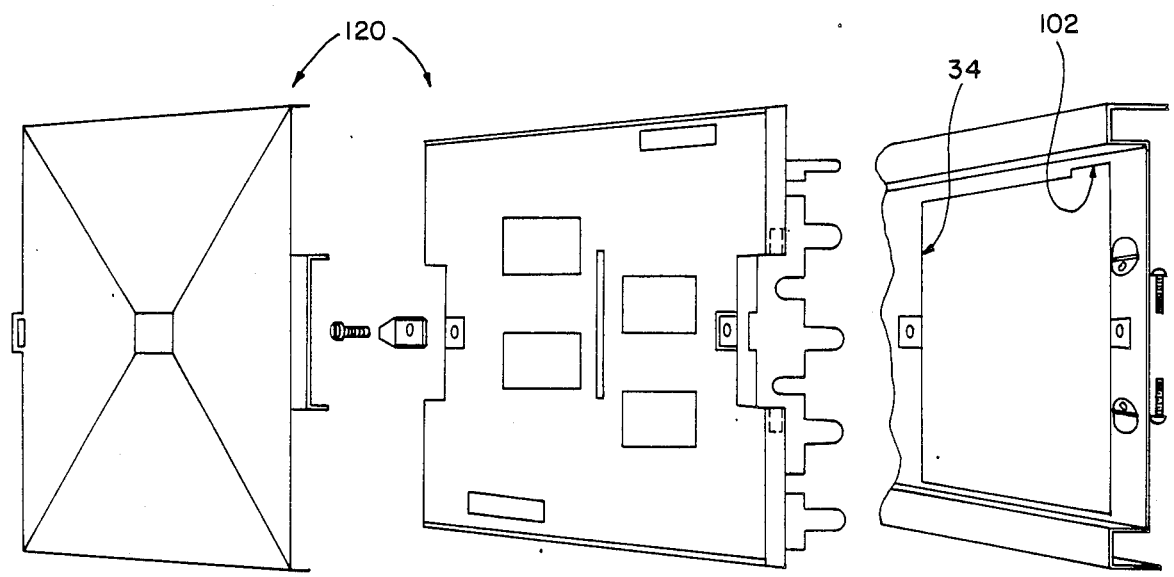
FIG. 8 is an exploded perspective view showing a plug-in base assembly and side rail of the present invention.
Figure 9:
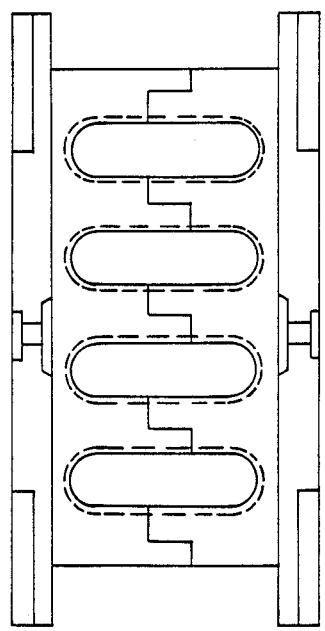
FIG. 9 is an end view of the base shown in FIG. 8 in back to back association with another base.
Figure 10:
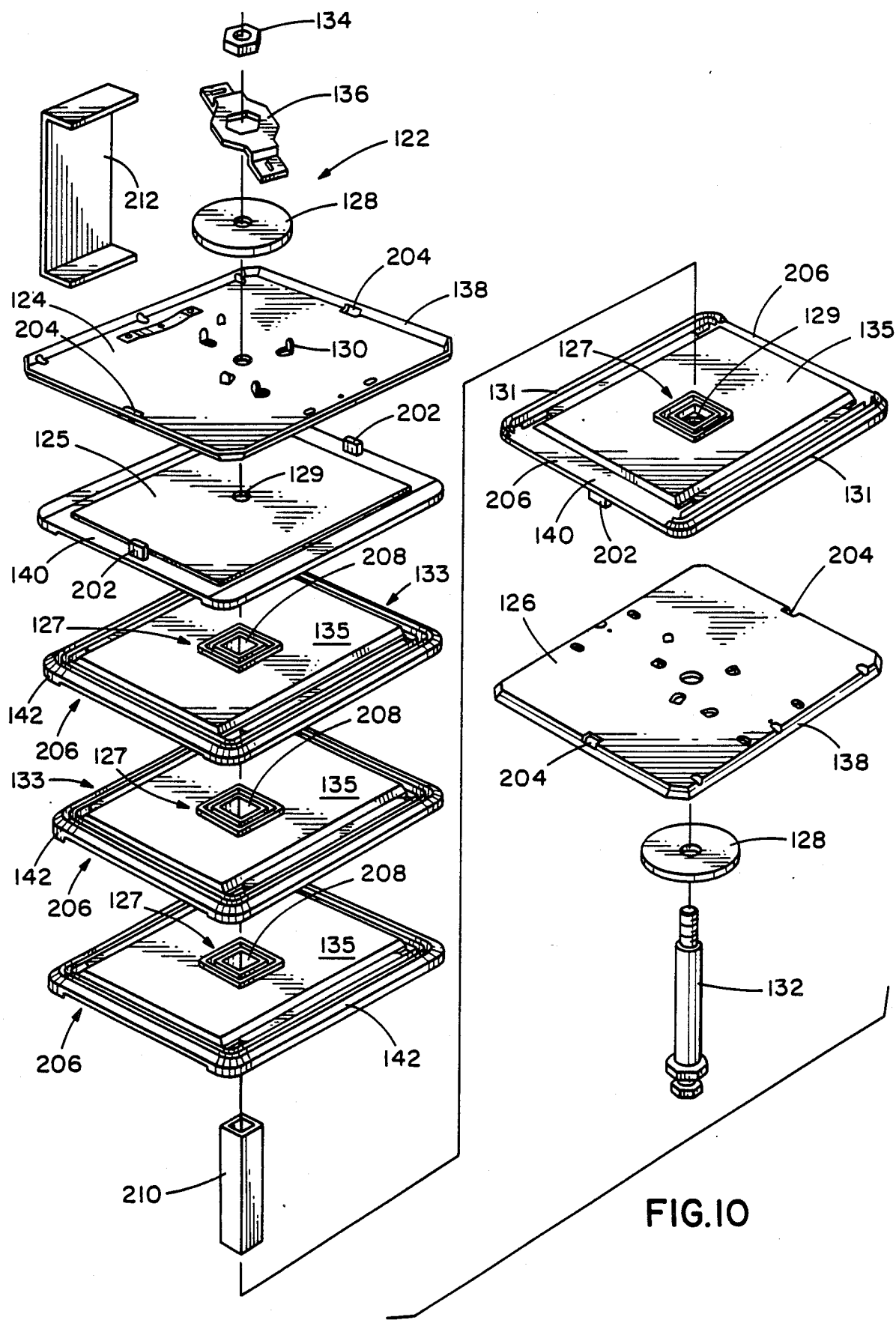
FIG. 10 is an exploded perspective view of a joint in accordance with the present invention.

On both the plug-in sections 32 and feeder sections 30, the ground bus 42 includes a flared end portion 48 to accommodate the separation between bus bars required for splice connection between sections. The flared end portion 48 as shown in FIGS. 2 and 5 includes an inclined section 50 and an extending connecting portion 52 on both the upper sections 44 and lower sections 46 of the ground bus 42. The flared formation facilitates drainage of water which may fall on the joint area. The plug-in sections 32 of busway include humped portions 54 on both the upper and lower sections, 44 and 46, respectively, of ground bus 42 corresponding to the plug-in opening locations 34 along the length of the busway. Each humped portion 54 includes opposite inclined top portions 56 and a bridging top portion 58 integrally connecting the two inclined top portions as well as opposite inclined bottom portions 60 and a bridging bottom portion 62 integrally connecting the two inclined bottom portions. Plug-in openings 63 are also provided in the ground bus at the plug-in locations.

The ground bus 42, together with the pair of opposite side rails 38 form a housing for the main phase bus bars. The opposing side rails each include a top channel 64, a bottom channel 66 and an inwardly recessed main side portion 68 intermediate the top and bottom channels. The rails are positioned such that the top and bottom channels, 64 and 66, respectively, are inwardly directed. At the end of each busway section, a cutout 70 is provided in the main side portion of each rail as shown in FIG. 5 where the bus bars are offset to facilitate connection between sections and removal of a connecting joint which will be later addressed in more detail.

At various locations along the length of the housing the side rails 38 are fastened to the upper and lower ground bus sections, 44 and 46, along the overlapping marginal side portions flanges 44b and 46b of the ground bus. This connection can be made by extending a plurality of standard fasteners 74 through aligned openings 76 in the side rails, upper section side flange, and lower section side flange, 76, 78 and 80, respectively. It has also been found that this connection can be made by extruding holes at appropriate positions in each rail, forcing the cylindrical extrusion 82 through the overlapping side flanges of the ground bus and crimping the extruded portion against the inside of the lower section of the ground bus. Although it has not been found to be necessary, additional fasteners such as nuts and bolts could also be used at selected openings provided by the crimped connection.

A plurality of ears 86 are bent inward from the main side portion of each rail such that the bottom edge 88 of each ear engages the top portion of the upper ground bus 44a and provides additional support and short circuit strength. The ears 86 are spaced apart on each rail as believed desirable and provide registered openings 90 on the opposing rail members. The openings 90 provide for drainage of water which would otherwise collect at the lower sections of the housing between the flared end portions 48 at the joints and the humped portions 54 at the plug-in locations. The ears are provided in pairs with the notched openings of each pair of ears in facing relationship, i.e., the opening extends from its associated ear toward its paired ear. A circular embossment 94 is formed between each pair of ears with a hole 96 at the center of the embossment 94. This facilitates connection of a generally U-shaped surge clamp 98 which has opposite mounting tabs 100 through which a fastener may connect the clamp 98 to the opposite rails. This provides an additional measure of protection for high fault currents.

As referred to previously, the plug-in sections 32 of busway are provided with plug-in openings 34 in the main side portions 68 of the side rails 38 at selected locations at which points the bus bars are spaced apart to facilitate tap-off connections. The plug-in openings 34 of the opposite side rails 38 are provided at the same location along the length of the bus bars contained therein, i.e., the openings on one side rail 38 are in registration with the openings on the opposite rail member. The opening is generally rectangular in shape and includes an offset notch 102 at the upper right corner to facilitate ground connections.

A ground clip 104 is fastened to the top portion of the ground bus by a fastener. Additional holes may be provided above the plug-in opening on the main side portion between the opening and the top channel to facilitate the riveted connection of the side rails to the upper section of the ground bus, if believed desirable.

A joint tie channel 106 is provided to help secure adjoining sections of busway together. The tie channel 106 is substantially U-shaped with a top flange 108 and a bottom flange 110 which overlie the respective top and bottom flanges of the side rails 38 of adjoining sections of busway. A recessed securing portion 112 is provided at each end of the symmetrical tie channel which forms top and bottom segments of receiving channels at each end of the tie channel that receives respective portions of the channels provided on the side rails.

A generally mushroom-shaped cutout 114 is provided on each securing portion forming securing legs 116 which extend outward on each end of the tie channel 106.

Additional holes 118 are formed in the securing portion which facilitate connection of the tie channel to the side rails of the adjoining sections of busway.

Each plug-in opening is associated with a swingable door 36 and a plug-in base assembly 120 which are more fully disclosed in U.S. application Ser. No. 650,378 by Allan Slicer filed concurrently herewith, the disclosure of which is hereby incorporated by reference.

The connecting joint 122 which is similar to the type shown in U.S. Pat. No. 3,384,854, is provided to facilitate the connection between sections of busway and can be used to connect a feeder section 30 to another feeder section or to a plug-in section 32. The connecting joint 122 includes a top cover plate 124 and a bottom cover plate 126 which each captivates a Belleville washer 128 under a pair of ears. A two headed bolt 132 extends through and connects the two cover plates 124 and 126 with a hex nut 134 at the top end which is retained by a nut retaining bracket 136. Each cover plate has an upwardly inclined periphery 138 to provide lead in for adjoining busway sections. A pair of identical outer insulators 140 or phase barriers and two or three identical inner insulators 142 or phase barriers are provided between the cover plates 124 and 126. The phase barriers are formed of a polyester glass such as cyglas 620.

The outer barriers each includes a pair of ears 202 which extend from an outer surface of the barrier and are received in respectively associated slots 204 in the cover plates. A silver or tin plated aluminum ground splice plate 125 is engaged with the outer surface of each outer barrier which, upon tightening the bolt, provides a ground connection between separate sections of busway as the ground splice plate engages the inner surface of the respective flared ends 48 of ground bus for adjoining sections of busway.

The opposite surface of the outer barriers 140 includes concentrically square ribs 127 formed about a central circular bolt receiving opening 129. Marginal ribs 131 are provided on opposite sides of the barrier extending generally perpendicular to the direction of the bus bars, i.e., from side rail to side rail.

Figure 11:
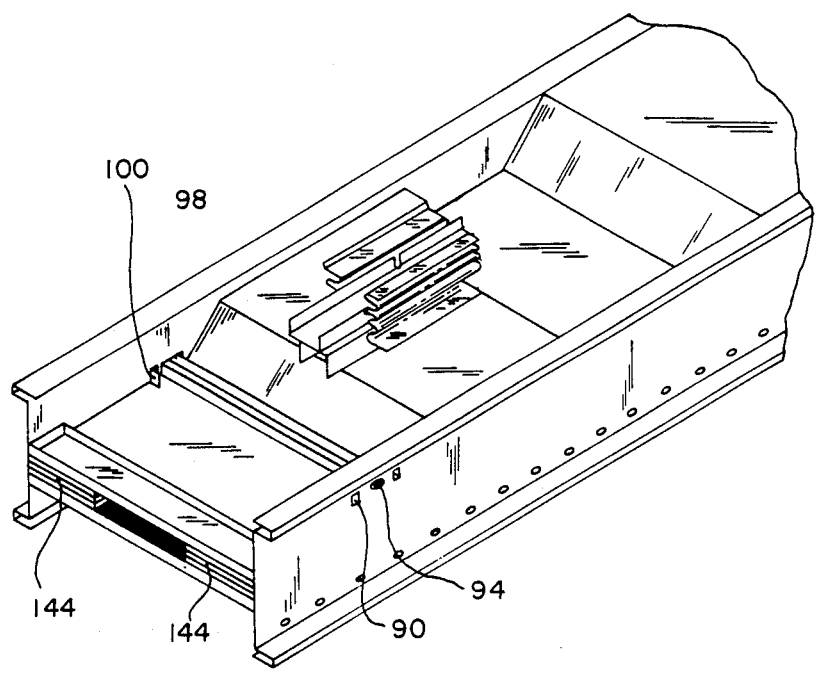
FIG. 11 is a partial perspective view showing a double sandwich section of plug-in busway in accordance with the present invention.

Marginal recessed portions 206 are provided on the other two sides of the barrier between the marginal ribs for receiving connecting insulators between connectors for the double or triple run bussing. FIG. 11 shows a cut-off section of double run busway.

The inner barriers are provided with a first surface facing toward the top cover plate and a second surface facing toward the bottom cover plate. The inner barriers each have a central square shaped opening 208 which receives the square shaped bolt insulating tube 210 and is provided with a pair of concentric square shaped ribs 127 extending from both the first and second surface. The inner ribs are dimensioned to coincide with the opening and form the walls of a square shaped passage.

The first surface of each inner barrier includes marginal ribs 133 around the circumference of the barrier while the second surface includes marginal ribs on opposite sides extending between the side rails and marginal recessed portions 206 on the other two sides between the ribs as described with respect to the outer barrier surface facing away from the adjacent cover plate 135.

A silver or tin plated aluminum or copper main phase connector plate 135 is provided with a square opening which receives the concentric square ribs 127 of an associated phase barrier. A pair of cooperating connector plates is associated with each main phase bus bar.

A square insulating tube which receives the bolt extends between the two outer phase barriers, being unable to pass through the circular opening 129 therein. The tube extends through the central square openings 208 of the inner barriers. The inner ribs and tube prevent rotation of the barriers about the bolt retaining the joint in tact when it is removed from the busway. A joint pull strap 212 can be connected to the cover plates that extends out from the side of a busway section. This strap is covered by the tie channel which has previously been described.

While the invention has particularly been shown and described with reference to a preferred embodiment, it will be understood by those skilled in the art that variations in form, construction and arrangements may be made therein without departing from the spirit and scope of the invention, all such variations are intended to be covered in the appended claims.

What we claim is:

1. A joint connector for providing a connection between sections of busway having a plurality of bus bars carried by each section of busway including a top and bottom ground bus, said joint comprising:
    a top plate having a central opening therein,
    a bottom plate having a central opening therein;
    a pair of identical outer barriers each having an outer side and an inner side and each having a central circular opening therein;
    a plurality of identical inner barriers, each having a central generally square-shaped opening therein;
    a pair of ground connector plates respectively associated in facing relationship with said top plate and said bottom plate,.
    a pair of joint connector plates in facing relationship with each other on each side of each inner barrier, each of said ground connector plates and joint connector plates having a central generally square-shaped opening therein,
    a bolt extending through said central openings in said top plate, said bottom plate, said outer barriers, said inner barriers, said ground connector plates and said joint connector plates; a nut threadingly engaged with said bolt and adapted to be tightened thereon; and
    a generally square-shaped insulating tube extending between said outer barriers, said bolt extending through said tube for drawing said plates together in response to the tightening of said nut and bolt to effect a splice connection between bus bars of each section, said top plate and said bottom plate each includes portions defining a plurality of slots; and each of said outer barriers includes a pair of ears extending from said outer surface and respectively received in an associated one of said slots, said outer barriers each includes a receiving channel formed by square-shaped first ribs extending from said inner side around said central opening, said tube having opposite ends respectively received by said receiving channels.

2. A joint connector as claimed in claim 1 wherein each of said inner barriers includes a square-shaped first rib extending from each side, said first ribs dimensioned to coincide with said square-shaped opening in said inner barrier.

3. A joint connector as claimed in claim 2 wherein each of said inner and outer barriers includes a second rib concentric with each of said first ribs.

4. A joint connector as claimed in claim 2 including a pull strap having one end connected to said top plate and a second end connected to said bottom plate.

* * * * *